United States Patent
Becker et al.

(10) Patent No.: US 6,833,632 B2
(45) Date of Patent: Dec. 21, 2004

(54) DETACHABLE COUPLING DEVICE FOR A WIND POWER PLANT HAVING POSITIVE LOCKING AND FRICTION FIT CONNECTIONS

(75) Inventors: Markus Becker, Rheine (DE); Roland Weitkamp, Belm-Icker (DE); Vincent Schellings, Enschede (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/126,639

(22) Filed: Apr. 19, 2002

(65) Prior Publication Data

US 2003/0102677 A1 Jun. 5, 2003

(30) Foreign Application Priority Data

Apr. 20, 2001 (DE) .......................... 101 19 427

(51) Int. Cl.[7] .............................. F03D 9/00; F03D 1/00; F03D 11/02
(52) U.S. Cl. ............... 290/55; 290/44; 290/54
(58) Field of Search ................ 290/44, 54–55

(56) References Cited

U.S. PATENT DOCUMENTS

| | | | |
|---|---|---|---|
| 1,512,966 A | | 10/1924 | Wingard |
| 3,614,492 A | * | 10/1971 | Yatsuhiro et al. ............. 310/31 |
| 3,832,908 A | * | 9/1974 | Brewster ................... 74/10.33 |
| 4,028,909 A | | 6/1977 | Jancic et al. |
| 4,074,952 A | * | 2/1978 | Fradenburgh et al. ........ 416/87 |
| 4,080,097 A | * | 3/1978 | Hager et al. .................. 416/87 |
| 4,117,742 A | * | 10/1978 | Stein ......................... 74/573 R |
| 4,129,403 A | * | 12/1978 | Watson .................... 416/134 A |
| 4,140,433 A | * | 2/1979 | Eckel ....................... 415/209.1 |
| 4,239,977 A | * | 12/1980 | Strutman ..................... 290/44 |
| 4,329,117 A | * | 5/1982 | Doman ................... 416/170 R |
| 4,331,040 A | * | 5/1982 | Swasey ....................... 74/409 |

(List continued on next page.)

FOREIGN PATENT DOCUMENTS

| | | |
|---|---|---|
| DE | 199 16 454 A1 | 10/2000 |
| DE | 199 17 605 A1 | 1/2001 |
| DE | 100 15 287 A1 | 10/2001 |

*Primary Examiner*—Joseph Waks
*Assistant Examiner*—Pedro J. Cuevas
(74) *Attorney, Agent, or Firm*—Blakely, Sokoloff, Taylor & Zafman LLP

(57) ABSTRACT

The invention involves a coupling device for a wind power plant with a rotor shaft that carries at least one rotor blade of the wind power plant, a gear shaft running coaxially to the rotor shaft, and a coupling device coupling the rotor shaft to the gear shaft, whereby the coupling device has at least one connection element that can be detachably affixed on the rotor shaft to an attachment element designed to create a positive locking connection, and one coupling element designed to create a friction-fit connection between the connection element, on the one hand, and an additional connection element and/or the gear shaft, on the other hand.

20 Claims, 3 Drawing Sheets

U.S. PATENT DOCUMENTS

Figure 1:
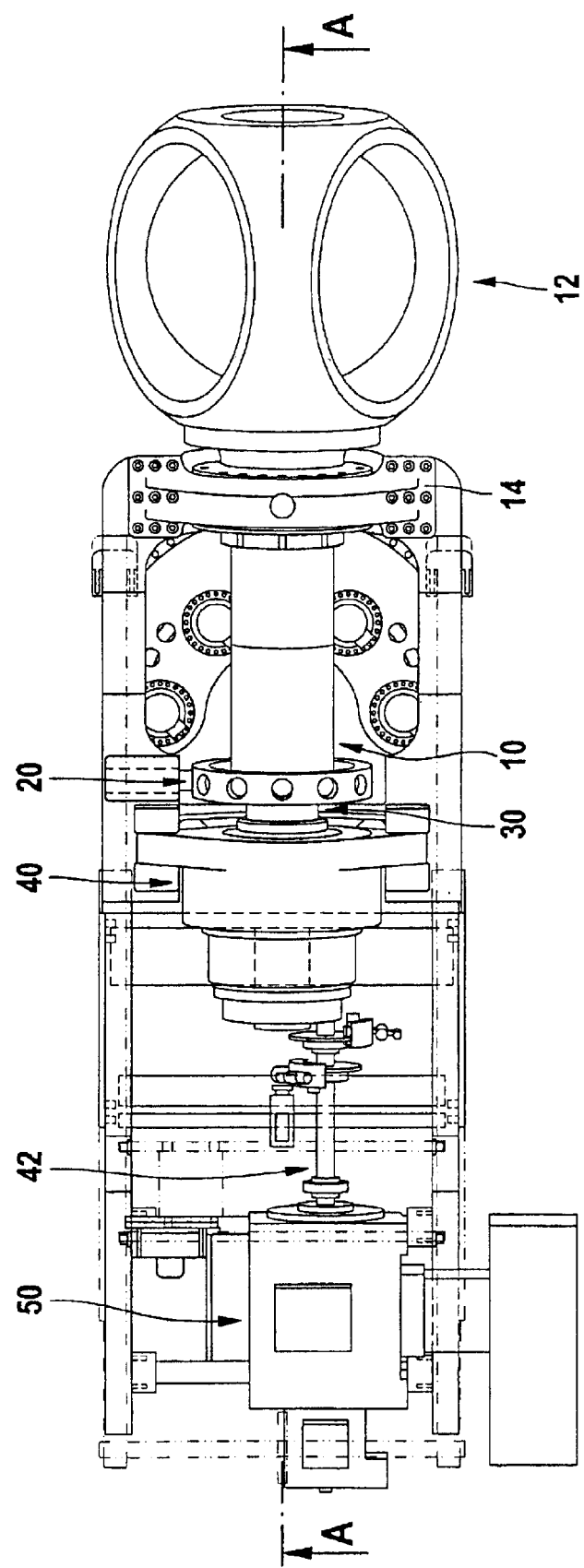

| | | | | |
|---|---|---|---|---|
| 4,391,163 A | * | 7/1983 | Benthake et al. | 475/337 |
| 4,469,965 A | * | 9/1984 | Eckel | 310/254 |
| 4,527,072 A | * | 7/1985 | van Degeer | 290/55 |
| 4,557,666 A | * | 12/1985 | Baskin et al. | 416/32 |
| 4,656,890 A | * | 4/1987 | Marquardt | 475/348 |
| 4,657,645 A | * | 4/1987 | Hinman | 205/666 |
| 4,684,455 A | * | 8/1987 | Hinman | 204/212 |
| 4,757,211 A | * | 7/1988 | Kristensen | 290/55 |
| 4,871,923 A | * | 10/1989 | Scholz et al. | 290/55 |
| 4,912,995 A | * | 4/1990 | Otters | 74/127 |
| 4,966,525 A | * | 10/1990 | Nielsen | 416/9 |
| 5,088,362 A | * | 2/1992 | Schalles | 82/142 |
| 5,222,924 A | * | 6/1993 | Shin et al. | 475/329 |
| 5,458,014 A | * | 10/1995 | Thomas et al. | 74/325 |
| 5,663,600 A | * | 9/1997 | Baek et al. | 290/55 |
| 5,716,279 A | * | 2/1998 | Ham et al. | 464/159 |
| 5,787,766 A | * | 8/1998 | Blach | 74/665 G |
| 6,107,759 A | * | 8/2000 | Miller | 318/4 |
| 6,176,804 B1 | * | 1/2001 | Kekki et al. | 475/331 |
| 6,232,673 B1 | * | 5/2001 | Schoo et al. | 290/55 |
| 6,251,042 B1 | * | 6/2001 | Peterson et al. | 477/3 |
| 6,420,808 B1 | * | 7/2002 | Hosle | 310/83 |
| 6,427,549 B1 | * | 8/2002 | Bowen | 74/331 |
| 6,454,010 B1 | * | 9/2002 | Thomas et al. | 166/369 |
| 6,459,165 B1 | * | 10/2002 | Schoo | 290/1 C |
| 6,499,370 B2 | * | 12/2002 | Bowen | 74/330 |
| 6,543,401 B2 | * | 4/2003 | Trease | 123/90.31 |
| 6,554,791 B1 | * | 4/2003 | Cartledge et al. | 604/67 |
| 6,591,705 B1 | * | 7/2003 | Reik et al. | 74/343 |
| 6,634,247 B2 | * | 10/2003 | Pels et al. | 74/329 |
| 6,634,853 B1 | * | 10/2003 | Anderson | 415/70 |
| 6,720,670 B2 | * | 4/2004 | Makino et al. | 290/55 |
| 6,742,785 B1 | * | 6/2004 | Weller | 279/2.17 |
| 6,750,559 B2 | * | 6/2004 | Becker | 290/55 |
| 6,758,656 B2 | * | 7/2004 | Maier et al. | 417/203 |
| 6,758,781 B2 | * | 7/2004 | Kusumoto et al. | 475/13 |
| 6,759,758 B2 | * | 7/2004 | Torres Martinez | 290/55 |
| 6,769,874 B2 | * | 8/2004 | Arel | 416/95 |
| 6,770,007 B2 | * | 8/2004 | Fox | 475/348 |

* cited by examiner

DETACHABLE COUPLING DEVICE FOR A WIND POWER PLANT HAVING POSITIVE LOCKING AND FRICTION FIT CONNECTIONS

The invention involves a coupling device for a wind power plant with a rotor shaft that carries at least one rotor blade of the wind power plant, a gear shaft running coaxially to the rotor shaft, and a coupling device coupling the rotor shaft to the gear shaft.

In modern wind power plants, the rotor rotation is transferred via the rotor blades, possibly via a rotor shaft that carries a hub affixed to them, to the input shaft of a gear, whose output shaft is connected to a generator for power generation. In the process, the gear and the generator are usually housed in a machine housing that is set in bearings so that it can rotate on a tower of the wind power plant. The height of this tower can be 100 m or more.

If during the operation of the wind power plant, malfunctions occur in the area of the gear and/or the rotor shaft and/or the rotor bearings, the rotor shaft must be separated from the input shaft of the gear. For this reason, it is necessary that the coupling device coupling the rotor shaft to the gear shaft is designed so that the gear shaft can be separated from the rotor shaft quickly and easily. Furthermore, this coupling device must also make possible a malfunction-free transfer of the bending moment and the torque from the rotor shaft that has a diameter of one meter or more to the gear shaft. In known coupling devices for wind power plants, this transfer of the bending moment and torque is achieved using so-called tension sets with which the gear shaft constructed as a hollow shaft is pressed in the radial direction onto the rotor shaft that is inserted into the gear shaft. However, the solution of the non-positive connection between the rotor shaft and the gear shaft caused by these tension sets presents problems in many cases, because the individual elements of the tension sets tighten during the operation of the wind power plant. Furthermore, when using these tension sets, it is considered problematic that to separate the gear from the rotor shaft, at first the gear shaft must be separated from the rotor shaft in the horizontal direction, which presents large problems for rotor shafts with a diameter of one meter or more, and the rotors affixed to them with a diameter of 70 m or more, and the correspondingly dimensioned gear shafts.

To solve these problems, torque transfer devices have already been proposed for wind power plants, in which the end of the gear shaft faces the rotor shaft has a flange-type radial expansion and the coupling of the gear shaft to the rotor shaft is made using bolts that engage in an end face of the rotor shaft that faces the gear shaft and pass through this flange-type expansion. In the process, the rotor shaft of the known torque transfer devices can also have one or more receptacle spaces to receive a connection element for the rotational non-positive connection of the rotor shaft with the gear shaft, whereby corresponding receptacle spaces are also provided in the gear shaft. With this device, a separation of the gear from the gear shaft can be achieved without horizontal shifting of the gear shaft relative to the rotor, whereby the assembly and/or the replacement of the gear parts of the rotor and the rotor bearing is clearly simplified. However, it has turned out that the separation of the connection elements used in the receptacle spaces, and designed, for example, in the form of feather keys, present problems in many cases, especially after longer operating times of the wind power plant, which in turn leads to problems in the separation of the gear and/or the gear shaft from the rotor and/or rotor shaft.

In view of this problem in the state of the art, the purpose of the invention is to prepare a coupling device for a wind power plant of the type named above, which allows an additional simplification of the maintenance work as well as simple assembly.

According to the invention, this purpose is achieved by a further development of the known coupling devices, which is essentially characterized in that the coupling device has at least one connection element, which can be detachably affixed on the rotor shaft to an attachment element designed to create a positive locking connection, and one coupling element that is designed to create a friction-fit connection between the connection element, on the one hand, and an additional connection element and/or gear shaft, on the other hand.

This invention originates from the discovery that the problems in the state of the art explained at the beginning can be solved when the coupling of the rotor shaft to the gear shaft is done in at least two stages, whereby at first via a positive locking connection that can be impinged with large forces but can be detached again only with difficulty, a connection element is coupled to the rotor shaft, which is itself coupled to the gear shaft via a friction-fit connection that can be easily detached but generally can only be impinged with small forces. In the process, the coupling of the connection element to the gear shaft can, if necessary, be made via one or more additional connection elements. In order to detach the gear shaft from the rotor shaft, it is only necessary to detach the friction-fit connection, which usually does not cause any problems, whereas a detachment of the positive locking connection is still necessary to replace the roller bearing of the rotor shaft, which, however, is not performed on-site. In this way, maintenance and repair work is made considerably easier. Furthermore, the arrangement of the coupling device according to the invention also makes possible an especially easy assembly of the wind power plant, because at first the rotor bearing can be shoved over the rotor shaft, and only after that must the connection element be affixed to the attachment element in a positive locking manner on the rotor shaft.

To further simplify the assembly and maintenance work, it has proven to be especially favorable if the additional connection element that is connected in a friction-fit manner to the connection element is affixed to at least one additional attachment element designed to create a positive locking connection on the gear shaft. In this case, during the assembly, at first the gear bearing can be shoved on the gear shaft and only after that, the attachment of the additional connection element to the gear shaft and the friction-fit connection of the individual connection elements to each other are done.

In regard to the prevention of an excessive loading of the friction-fit connection during the transfer of large torques, it has proven to be especially favorable if at least one coupling element is arranged in the radial direction outside of the sheath surface of the rotor shaft so that even during the transfer of large torques, because of the comparatively large separation distance of this coupling element from the rotational axis, only small forces act on this coupling element. In the embodiment form of the invention last described, the connection element functionally has a flange that is essentially rotationally symmetric and is attached to the end face of the rotor shaft that becomes flush at its end that faces the gear shaft. The flange has a larger diameter than the rotor shaft.

In order to create a positive locking connection between this connection element and the rotor shaft, an attachment element is used in the form of a clamping sleeve that passes through the connection element and is inserted into the end face of the rotor shaft that faces the gear shaft. The additional connection element, also designed functionally in the form of a flange that is essentially rotationally symmetrical and has a larger diameter than the rotor shaft and/or the gear shaft, can also be affixed in a positive locking manner on the gear shaft to a clamping sheath that passes through this connection element and is inserted in the end area of the gear shaft that faces the rotor shaft and is preferably radially expanded.

If at least one clamping sheath inserted into the end face of the rotor shaft runs coaxially to a clamping sheath that is inserted into the end area of the gear shaft is designed in order to create a friction-fit connection between the rotor shaft and the gear shaft, and is functionally designed in the form of a bolt that is inserted into the rotor shaft or into the gear shaft, a pre-tensioning of the connection between the rotor shaft, the connection elements, and the gear shaft can be created using an additional coupling element that passes through this clamping sheath. Using this additional coupling element preferably designed in the form of a bolt, the bending moments can also be transferred from the rotor shaft to the gear shaft, in order to, in this way, unload the coupling elements which might be displaced radially to the outside. These coupling elements can also be designed in the form of coupling bolts, in particular, screwed bolts, with bolt axes running approximately parallel to the longitudinal axis of the rotor shaft, whereby at least one of the coupling elements that is displaced radially to the outside goes through the connection element and/or the additional connection element.

In regard to maintaining an introduction of force that is as symmetrical as possible, while simultaneously ensuring a reliable torque transfer, it has proven to be especially functional if the coupling device has a plurality of coupling elements preferably arranged distributed at uniform distances in the circumferential direction of the rotor shaft, each of which can be arranged at the same radial distance from the rotational axis of the rotor shaft.

In order to prevent the transfer of a bending moments to the coupling elements used for the torque transfer, it has proven to be functional if the connection element and/or the additional connection element is made of a weaker material and/or can be more easily deformed than the rotor shaft, the gear shaft and/or the attachment bolts, because in this construction, bending moments are first to be received by the shafts and/or additional coupling elements and lead at first to a deformation of the connection elements prior to their transfer to the coupling elements. In the process, an easier deformability can not only be achieved by a corresponding selection of materials, but also by a corresponding geometric design of the connection elements. This geometric design can make use of profilings of the connection elements and/or target bending points in the connection elements.

In the performance of repair and/or maintenance work on a wind power plant, the rotor must be fixed in order to reduce the risk of injury during repair and maintenance work. For this purpose, the coupling device of the device according to the invention has, in a preferred embodiment form of the invention, a stopping device to stop the rotor shaft and thus also the rotor blades carried by it. This stopping can be achieved using a radial and/or axial positive locking.

Even though consideration is given to the implementation of stopping arrangements, with which the rotor can be stopped in any desired rotational position, it has proven to be especially favorable for the purpose of making easier the maintenance work by creation of defined geometric relationships, if the stopping device has at least one stopping element to stop the rotor shaft in at least one prespecified rotational position. This stopping element can contain at least one stopper opening which faces radially to the outside relative to the rotor shaft and in which a stopping bolt is inserted to stop the rotor.

To maintain as symmetrical an overall arrangement as possible, the stopping arrangement functionally has a stopper ring that surrounds the connection element and/or the additional connection element and preferably is affixed to the connection element that is detachably affixed to the rotor shaft. In this preferred stopping arrangement, the rotor shaft can be stopped without impairment of the detachment of the gear shaft from it. With a stopper ring that surrounds the connection element, a stopping of the rotor shaft can be implemented in a plurality of prespecified rotational positions, if the stopper ring has a plurality of stopping elements arranged one behind the other in the circumferential direction of the rotor shaft, such as stopper openings, for example.

Figure 2:
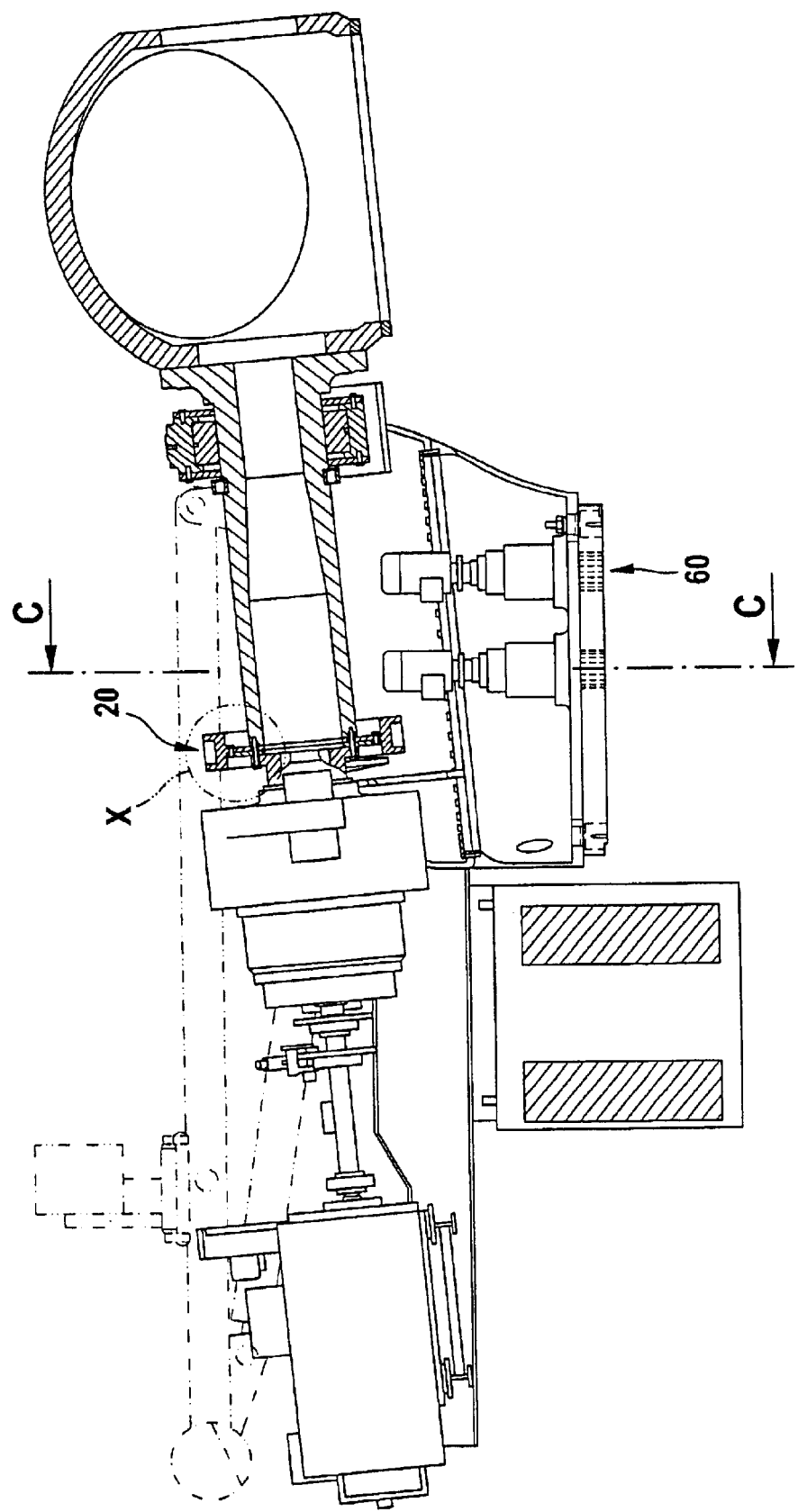
Figure 3:
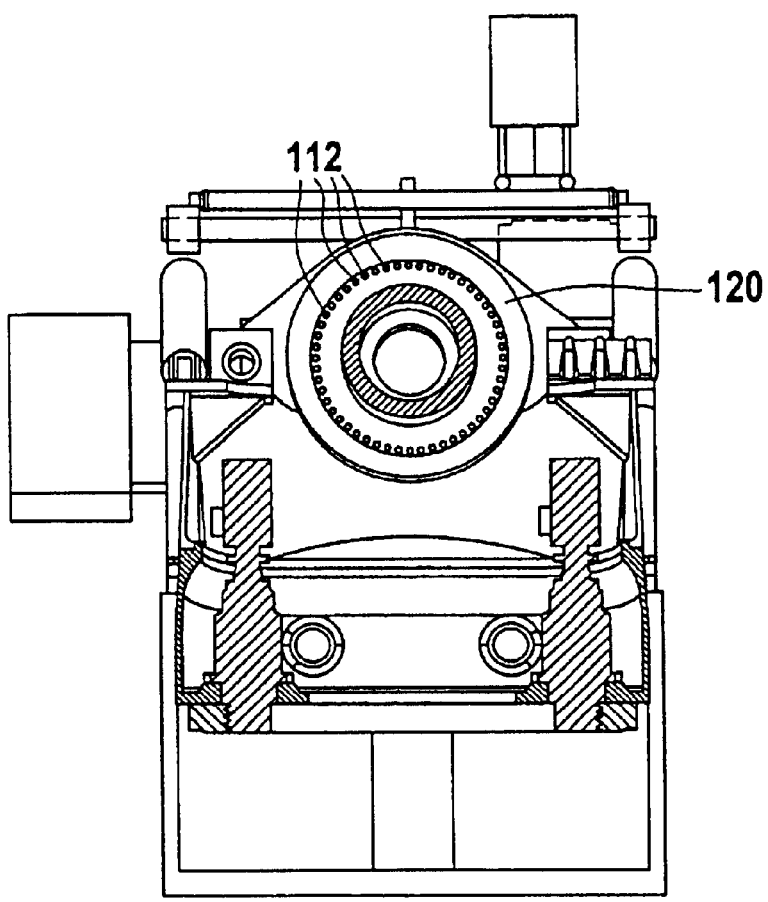
Figure 4:
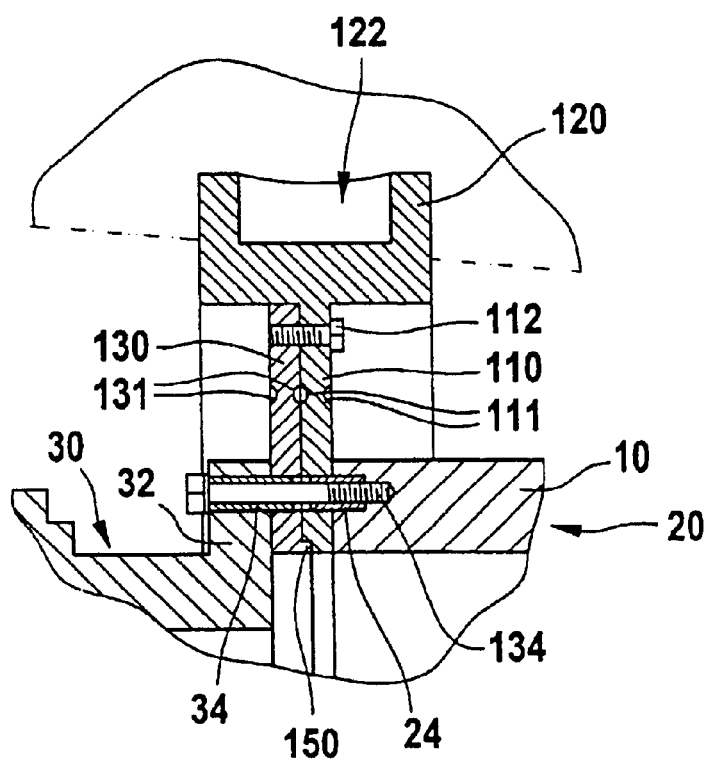

In the following, the invention is explained in reference to the drawing, to which reference is made expressly in regard to all of the details that are characteristic of the invention and not explained in greater detail in the description. Shown in the drawing are:

FIG. 1 a view of a machine housing with a torque transfer device according to the invention, FIG. 2 a section diagram of the machine housing with the torque transfer device according to FIG. 1 along the section plane A—A in FIG. 1, FIG. 3 a section diagram of the machine housing shown in FIG. 1 with the torque transfer device along the section plane C—C shown in FIG. 2, FIG. 4 a detail diagram of the coupling area between the rotor shaft and the gear shaft indicated in FIG. 2 by X.

The torque transfer device shown in the drawing contains a rotor shaft 10 designed as a hollow shaft (see FIG. 2). This rotor shaft 10 is connected at its one end to a hub 12 of the rotor, whereby this hub 12 has a total of three recesses, each of which is to receive a rotor blade. In the area of the end connected to the hub 12, the rotor shaft 10 is set in a bearing 14 surrounding it in a manner so that it can rotate. On its end opposite the hub 12, the rotor shaft 10 is connected to the input shaft 30 of a gear 40. For this purpose, a coupling device 20 is provided, as shown in detail in FIG. 4. The output shaft 42 of the gear 40 is connected to a generator 50. The bearing 14, the coupling device 20, the gear 40, and the generator 50 are set in a pivot bearing, indicated in its entirety by 60, so that they can rotate on the tower (not shown) of a wind power plant.

As is shown especially clearly in FIG. 4, the gear shaft 30 has on its end that faces the rotor shaft 10, an end area 32 that expands radially in the manner of a flange. The coupling device 20 essentially contains a first flange 110, a second flange 130 and a plurality of coupling elements 112 connecting the first flange 110 to the second flange 130. The flange 110 is attached to a plurality of clamping sheaths 24 on the rotor shaft 10, which are arranged one behind the other in the circumferential direction and pass through the flange 110 and are inserted into the end face of the rotor shaft 10 which faces the gear shaft 30. Likewise, the flange 130 is attached to a plurality of clamping sheaths 34 on the gear shaft 30, which are arranged one behind the other in the circumferential direction, passing through this flange 130, and are inserted into the radially expanded end area of the gear shaft 30. The combination of the rotor shaft 10 and the associated flange 110, as well as the gear shaft 30 and associated flange 130 are preferably handled in a combined clamping, in order to ensure an optimal carrying capacity of the clamping sheaths 24 and/or 34. The clamping sheaths 24 and 34 are each arranged coaxially to one another. In order to produce a friction-fit connection which receives the bending moment, between the rotor shaft 10 and the gear shaft 30, a plurality of screwed bolts 134 is provided, each passing through one of the clamping sheaths 34 and 24. The bolts 134 are screwed into the end faces of the rotor shaft that faces the gear shaft. In the process, with the clamping sheaths 24 and 34, torques are transferred from the rotor shaft 10 to the flange 110 and/or from the flange 130 to the gear shaft 30, while with the screwed bolts 134, the bending moments are transferred. The flange 110 has a larger diameter than the rotor shaft 10 and rests on one of the end faces of this rotor shaft 10 which faces the gear shaft 30. At a position that lies radially outside the sheath surface of the rotor shaft 10, the flange 110 is affixed to flange 130 using the coupling elements 112 constructed as screwed bolts. Furthermore, the flanges 110 and 130 are centered relative to each other by a centering seat 150.

During a rotation of the rotor shaft 10, the torque resulting from this is at first transferred via the clamping sheaths 24 to the flange 110, and then via the coupling elements 112 to the flange 130, and finally via the clamping sheaths 34 to the gear shaft 30. In the process, the torque transfer between the flange 110 allocated to the rotor shaft 10 and the flange 130 allocated to the gear shaft 30 takes place at a position lying radially outside of the sheath surface of the rotor shaft 10 and is thus connected to a force on the coupling elements 112 which becomes smaller with the distance between the coupling element 112 and the rotor axis. In this way it is achieved that these coupling elements 112 are not impinged by excessive forces during the operation of the wind power plant even during the transfer of large torques. In order to prevent the transfer of bending moments to the coupling elements 112, the flanges 110 and 130 are provided with profilings 111 and/or 131, which form target bending positions in the flange 110 and 130, so that possibly occurring bending moments are transferred from the screwed bolts 134, whereas the coupling elements 112 are kept free of a bending load by elastic deformation of the flanges 110, 130. As an alternative or in addition, the flanges 110 and 130 can also be formed from a weaker material in comparison to the rotor shaft 10, gear shaft 30 and the attachment bolts 134 in order to thus prevent a transfer onto the coupling elements, of the bending moments occurring during the operation of a wind power plant.

The flange 110 is surrounded by a stopper ring 120, which has a plurality of stopper openings 122 pointing radially outwards. Into these stopper openings, stopper bolts (not shown in the drawing) can be inserted to stop the rotor shaft in a prespecified rotational position. In the process, by the arrangement of the stopper openings radially outwards, it can be achieved that only a comparatively small force is needed in order to stop the rotor shaft. As shown in FIG. 4, the inner boundary surface of the stopper ring 120 has approximately the same diameter as the flange 130 that is affixed to the gear shaft 30 in a manner so that it can be detached.

With the coupling device explained using the drawing, the gear 40 can be itself detached from the rotor shaft 10 without any noteworthy horizontal movement of the rotor shaft 10 and/or the gear 40. Moreover, the units to be detached from each other must only be slid out of each other horizontally by a distance corresponding to the axial length of the centering seat 150. Furthermore, this detachment of the rotor shaft 10 from the gear shaft 30 and/or the mounting of the rotor shaft 10 onto the gear shaft 30 is associated with a comparatively low work expenditure, because for this purpose, only the coupling elements 112 constructed as screwed bolts and the attachment elements 134 likewise constructed as screwed bolts must be loosened and/or tightened. Furthermore, the connection can also be undone without problems after a comparatively long operating time. Furthermore, the device explained using the drawing offers constructive advantages, because the stopper device for the rotor is integrated into the coupling device 20 and for this reason, no additional material and/or no additional mass is necessary for the implementation of the stopper arrangement. Also, the device according to the invention opens up the possibility for constructing the rotor shaft as a hollow shaft.

The invention is not limited to the embodiment example explained using the drawing. In particular, those designs are also considered in which instead of the hollow shaft, a massive shaft is used. Also, instead of the stopper openings, stopper bolts can be provided on the stopper rings 120, which act together with corresponding stopper sheaths.

What is claimed is:

1. An apparatus, comprising:
   a rotor shaft for a wind power plant to carry at least one rotor blade of the wind power plant;
   a coupling device; and
   a gear shaft running coaxially to the rotor shaft, wherein the coupling device couples the rotor shaft to the gear shaft characterized in that the coupling device has a first connection element that can be detachably affixed on the rotor shaft to a first attachment element designed to create a positive locking connection and a friction-fit connection between the gear shaft and the rotor shaft.

2. The apparatus of claim 1, wherein the coupling device further comprises:
   a second connection element affixed to the gear shaft to create a positive locking connection.

3. The apparatus of claim 1, wherein the coupling device further comprises:
   a coupling element passed through the first attachment element to produce a friction-fit connection between the rotor shaft and the gear shaft.

4. The apparatus of claim 1, wherein the first connection element has a flange that is essentially rotationally symmetric and is attached to the end face of the rotor shaft which becomes flush at its end that faces the gear shaft, and that the flange has a larger diameter than the rotor shaft.

5. The apparatus of claim 1, wherein the first attachment element is a clamping sleeve that passes through the first connection element and is inserted into the rotor shaft.

6. The apparatus of claim 2, wherein the coupling device further comprises:
   a clamping sleeve that passes through the second connection element and is inserted in the gear shaft to produce a friction-fit connection between the rotor shaft and the gear shaft.

7. The apparatus of claim 5, wherein the first attachment element is inserted into the rotor shaft and runs coaxially to a clamping sleeve that is inserted into the gear shaft.

8. The apparatus of claim 3, wherein the coupling element is a coupling bolt with a bolt axis running approximately parallel to the longitudinal axis of the rotor shaft.

9. The apparatus of claim 1, wherein the coupling device further comprises:

a coupling element passed through the first connection element.

10. The apparatus of claim 9, wherein the coupling device further comprises: a plurality of coupling elements including the first connection element preferably arranged at equal distances one behind the other in the circumferential direction of the rotor shaft.

11. The apparatus of claim 1, wherein the first connection element is made of a weaker material that can be more easily deformed than the rotor shaft.

12. The apparatus of claim 1, wherein the coupling device further comprises: a stopper arrangement for stopping the rotor shaft.

13. The apparatus of claim 12, wherein the stopper arrangement has at least one stopper element for stopping the rotor shaft in at least one prespecified rotational position.

14. The apparatus of claim 13, wherein the at least one stopper element has a stopper opening facing radially outwards relative to the rotor shaft.

15. The apparatus of claim 12, wherein the stopper arrangement has a stopper ring that surrounds the first connection element and is preferably affixed to the connection element.

16. The apparatus of claim 15, wherein the stopper ring has a plurality of stopper elements with stopper openings that are arranged one behind the other in the circumferential direction.

17. Wind power plant with a coupling device according to claim 1.

18. An apparatus, comprising:
   a rotor shaft for a wind power plant to carry at least one rotor blade of the wind power plant;
   a coupling device; and
   a gear shaft running coaxially to the rotor shaft, wherein the coupling device couples the rotor shaft to the gear shaft characterized in that the coupling device has a flange with coupling bolts that can be detachably affixed on the rotor shaft to create a positive locking connection between the gear shaft and the rotor shaft and a clamping sleeve to create a friction-fit connection between the gear shaft and the rotor shaft, wherein the flange is made of a weaker material that can be more easily deformed than the rotor shaft.

19. The apparatus of claim 2, wherein the coupling device further comprises:
   a coupling element passed through the first attachment element to produce a friction-fit connection between the rotor shaft and the gear shaft.

20. The apparatus of claim 19, wherein the coupling element is a coupling bolt with a bolt axis running approximately parallel to the longitudinal axis of the rotor shaft.

* * * * *